Feb. 9, 1937. L. L. SCHAUER ET AL 2,070,372
SLEEVELESS MOTION REVERSER
Original Filed Jan. 8, 1932 2 Sheets-Sheet 1
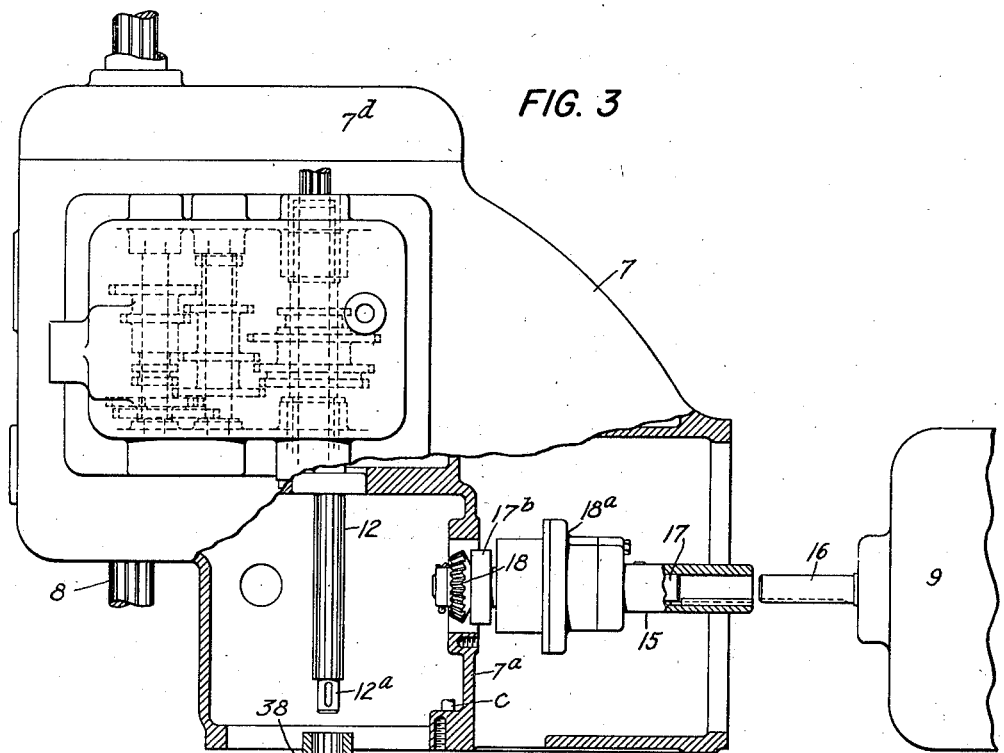
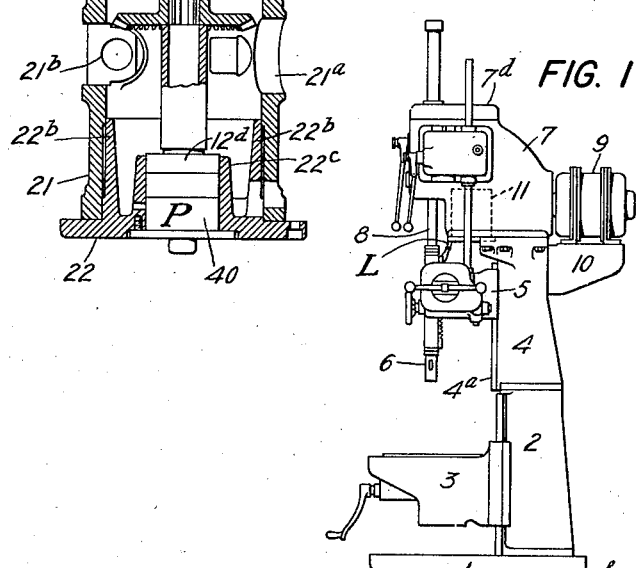
INVENTORS
Lawrence L. Schauer
Augustus M. Sosa
BY
Nathan, Bowman & Helferich
ATTORNEYS Feb. 9, 1937. L. L. SCHAUER ET AL 2,070,372
SLEEVELESS MOTION REVERSER
Original Filed Jan. 8, 1932   2 Sheets-Sheet 2
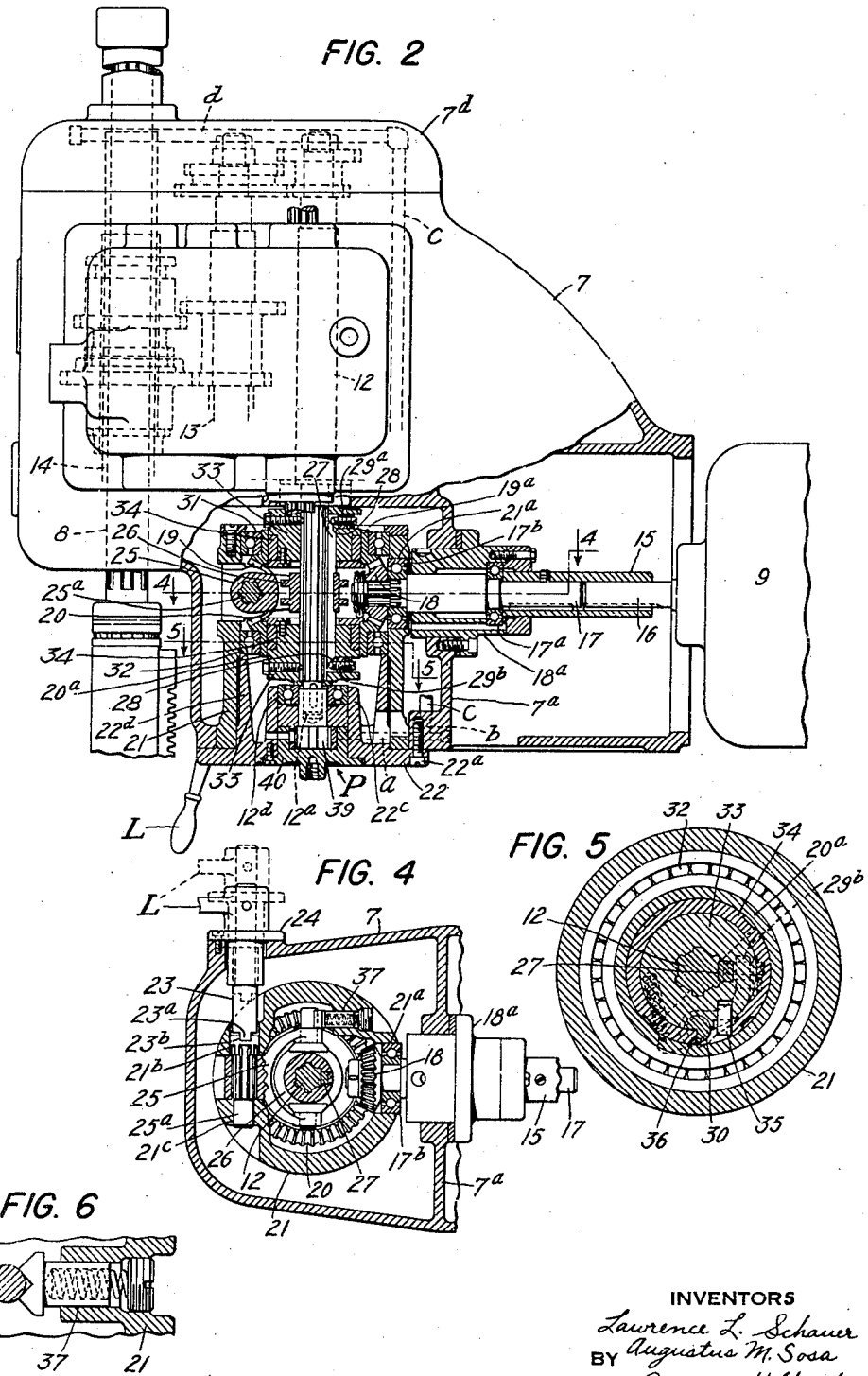
INVENTORS
Lawrence L. Schauer
BY Augustus M. Sosa
Nathan, Bowman & Helferich
ATTORNEYS Patented Feb. 9, 1937

2,070,372

UNITED STATES PATENT OFFICE 2,070,372

SLEEVELESS MOTION REVERSER

Lawrence L. Schauer, Wyoming, and Augustus M. Sosa, Cincinnati, Ohio, assignors to The Cincinnati Bickford Tool Company, Cincinnati, Ohio, a corporation of Ohio Original application January 8, 1932, Serial No. 585,478, now Patent No. 2,022,436. Divided and this application May 22, 1934, Serial No. 726,908

8 Claims. (Cl. 74—378)

The present invention relates in general to machine tools and more particularly to driving mechanisms for such machines and is a division of our earlier application, Patent No. 2,022,436 granted November 26, 1935.

A primary object of this invention is to provide a motion transmitter constructed on the unit principle so that the transmitter may be inserted or removed bodily from the transmission train, and so to construct the unit that it selectively may be fitted with separate and interchangeable power transmission mechanisms each designed to transmit a certain character of motion from one shaft to another as the demands of the trade may require.

A further object of this invention is to conserve space in the machine tool organization, as well as materials and labor in the construction of a driving unit having the above mentioned characteristics.

Still another object of this invention is to render available an improved insertable reversing unit capable of effecting instant reversals of motion with a high degree of efficiency and power without undue jarring or stressing of the shafts and gearing associated therewith.

Another object of the invention is to provide a driving unit having therein lubricating means adequate not only for the moving parts within the unit itself, but also for other moving parts of the transmission in which the unit may be inserted. And, in addition, to arrange the lubricating pump mechanism within the driving unit in such manner that it is, for all practical purposes, an integral part thereof, but which may itself be removed from the unit as a unitary assembly for inspection, cleaning or the replacement of parts.

In the attainment of the objects of this invention, it is proposed to construct the unit in a tubular casing capable of being inserted in a suitable aperture in the machine frame, one end of the casing being substantially closed by elements of the transmission inserted therein, and the other end being closed by a suitable cover plate. The cover plate preferably comprises an inner shell within which a lubricant pump is placed, and an outer shell which snugly fits within the tubular casing, the annular space between the two shells providing a reservoir or sump into which lubricating oil drains for re-circulation.

So that power may enter the unit, one of the side walls thereof is provided with an aperture of a size sufficient to admit a power shaft and a driving bevel pinion which cooperates with bevel gears journaled within the casing. The complete unit is so constructed that after the power shaft and drive gear have been withdrawn from the casing, the unit, including the lubricating means, may be moved bodily into and out of place in the machine frame as a cartridge in a gun.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side elevation of an upright drilling machine embodying the present invention. Fig. 2 is an enlarged sectional view of the head bracket and the gearing of a multiple purpose machine. Fig. 3 is a detail view of a portion of the head bracket illustrating the unitary reversing mechanism removed from the casing. Fig. 4 is a sectional plan view substantially along the line 4—4, Fig. 2 illustrating the clutch actuating mechanism. Fig. 5 is a sectional view of one of the clutches in the reversing mechanism. Fig. 6 is a detail view of one form of detent means for holding the clutch fork in its various positions.

It is well understood that a machine adapted solely for drilling operations requires only that the spindle be rotated forwardly and, simultaneously therewith, be fed axially thereby to force the drill into the work. A tapping machine, however, requires, in addition, that the tool spindle be rotated reversely at the end of the tapping operation so as to unscrew the tap from the threaded hole.

Fig. 2 illustrates the head bracket of a multiple purpose machine, or, in other words, one which may be utilized for both drilling and tapping operations and includes a reversible driving unit, later to be described. Fig. 3 shows the same head bracket about to be equipped with a uni-directional driving unit thereby to adapt the machine for drilling purposes only.

It will be appreciated that, by reason of this invention, a manufacturer may build these machines in large numbers, omitting the driving unit, and subsequently insert either a uni-directional driving unit or a reversible driving unit as the demands of the trade may require. The advantages arising from such convenience in manufacture will readily be perceived.

Another advantage arising from the interchangeability of the uni-directional and multi-directional driving units is that it enables a customer who may have previously purchased a plain drilling machine subsequently to change his machine into a combined drilling and tapping machine, at a nominal expense, by merely purchasing and bodily inserting the reversible driving unit.

Referring more specifically to the drawings, Fig. 1 represents one form of a machine tool to which this invention is particularly adaptable, namely, an upright drilling machine which is provided with a base 1, a frame or column 2 that supports a vertically adjustable work-table 3. An off-set raising block 4 is mounted upon the column 2 and is provided with guideways 4a upon which is translatably mounted a drill head 5 within which is rotatably and translatably journaled a tool spindle 6. The upper portion of the tool spindle is journaled in a head-bracket 7, also supported by the block 4, and maintains the spindle drive shaft 8 in vertical alignment. Power for effecting rotary and translatory movements of the spindle may be provided by a motor 9 which, in this instance, is mounted on a suitable bracket 10 supported by the block 4, or, if desired, power may be derived from a line shaft and brought into the machine by way of the conventional pulley and belt drive arrangement.

Referring more particularly to Fig. 2, a multiple purpose machine is provided by incorporating in the standard head-bracket 7 the power transmission assembly shown in this figure. With this arrangement the power from the motor 9 is transmitted to the spindle shaft 8 through the unitary reversing mechanism 11, later to be described in detail, or a one way driving connection such as illustrated in Fig. 3, and thence through transmission gear and clutch units located upon shafts 12 and 13 to the sleeve member 14 splined to the spindle shaft 8.

The power connection with the reversing mechanism 11 is effected through a suitable coupling 15, of which one end is keyed to the shaft 16 of the motor 9. The other end of the coupling is connected to one end of a shaft 17, journaled in an anti-friction bearing 17a, held in a bearing bracket 18a removably secured to an upright wall 7a of the head bracket and in a second anti-friction bearing 17b fitted in the housing 21. Secured to the inner end of the shaft 17 is a bevel pinion 18 which meshes with two bevel gears 19 and 20 journaled in bearings provided by a drum or housing 21. The housing 21 is substantially cylindrical in form and is removably mounted as a unit within the head-bracket 7. The lower open end of the housing 21 is substantially flush with the lower face of the head bracket 7 and is adapted to be closed and held in place by means of a member 22 secured to the head bracket by screws as 22a.

The gears 19 and 20 are driven in opposite directions, and either may be clutched to the shaft 12 to cause the latter to rotate in the desired direction. To effect selective engagement of the clutches there is provided a direction control lever L which is secured to one end of a clutch actuating shaft 23 journaled in a bearing member 24 secured to the side of the head bracket 7. The inner end of the shaft 23 has a tongue and groove connection 23a—23b with a short shaft 25a upon which is secured a clutch shifting fork 25 for controlling the position of a clutch spool 26. The spool 26 has secured thereto a cam bar 27 which is provided at each end with an inclined face 28 adapted to engage the free ends of clutch levers 29a and 29b selectively to oscillate short shafts 30 to which they are secured, thereby to render the clutches effective, as later will be described.

In order that the reversing mechanism be readily removable it is desirable that there be but a few parts designed and arranged as compactly as possible. To accomplish this end without sacrificing strength or rigidity of the mechanism, it is proposed to mount the oppositely running gears 19 and 20 in relatively large anti-friction bearings and so to proportion the parts that the resultant line of force of the driving gear falls within a circle not larger than the pitch circle or the circle formed by the path of the running balls in the anti-friction bearings, and to arrange the clutches, substantially in the same plane as the bearings. In this way a strong, durable, and easily removable reversing unit is constructed and one in which only two bearings need be employed, one for each gear, and the customary long sleeve on which the gears of previous reversing mechanisms, have been mounted, may be eliminated.

Referring more particularly to Fig. 2, it will be noted, that the bevel gears 19 and 20 are provided with extended hub portions 19a and 20a respectively, journaled in large anti-friction bearings 31 and 32 mounted in the removable housing 21. The inner surfaces of the hubs are mounted upon sleeve members 33 each having a splined connection with the shaft 12. So that either of the gears 19 or 20 may transmit motion to the shaft 12, each is provided with a relatively wide inner surface adapted to be engaged by wide expanding clutch ring 34 carried by the sleeve members 33. These clutch rings are located substantially in the plane of the anti-friction bearings 31 and 32 above mentioned.

Referring to Fig. 5, it will be seen, that one end of the expansible clutch ring 34 abuts against a stop pin 35, carried by the sleeve member 33, and the other end of the ring engages a notch 36 formed in the rock shaft 30. Thus as the shaft 30 is oscillated by the rocking of clutch lever 29b, the clutch ring 34 is expanded and brought into driving engagement with the hub of the running gear 20, thereby transmitting the rotary motion of the gear to the shaft 12. Spring pressed detent means such as that shown at 37 (Figs. 4 and 6) may be provided for retaining the clutch shifting fork 25 in any one of its three positions. At the free ends of the levers 29a and 29b adjusting screws are provided for taking up wear and for varying the degree of frictional engagement between the members.

If the character of the tooling operation for which the machine is intended does not require the reversing mechanism heretofore described, the same may be omitted, or removed as a unitary structure, and another unit inserted in place thereof. To make the change-over the motor and shaft 16 are withdrawn and bearing bracket 18a unbolted from the frame thus permitting the shaft 17 and bevel pinion 18 to be withdrawn from the housing 21. The clutch shifting shaft 23 is then withdrawn from the head bracket 7 and the housing 21 and mechanism contained therein are, (upon removal of screws 22a) free to be removed from the head casing 7 in their assembled form. After one driving unit has been removed from the bracket 7, a different unit such as illustrated in Fig. 3 may be inserted and the pinion 18 replaced and connected with the driving motor in the same manner as heretofore described.

So likewise other shafts and gear combinations may be inserted in the head in place of the arrangement above explained. Fig. 3 illustrates a simplified construction in which the standard head-bracket 7, the motor 9, the power or driving shaft 16, and the bevel pinion 18 are identical with the construction above described with reference to Fig. 2. The housing 21, however, is fitted with a single bevel gear 38 adapted to have a splined engagement with the shaft 12, instead of the more complicated reversible drive shown in Fig. 2. After the housing 21, of Fig. 3 has been inserted within the head 7 and the gear 38 has been fitted to the splined shaft 12, the driving pinion 18 is moved into mesh therewith, thereby establishing a uni-directional drive between the motor shaft and the shaft 12 in the head bracket.

All of the moving parts in the head-bracket, whether the bracket is fitted with the uni-directional drive unit of Fig. 3 or the reversible drive unit of Fig. 2, are maintained adequately lubricated by means of a cascade lubricating system carried wholly within the head bracket.

To this end, a pump P is carried by each of the removable drive units and is driven at a constant speed from the shaft 12 irrespective of the spindle speed. This pump is maintained submerged in the lubricant reservoir located in the base of the head-bracket, and comprises a rotor 39 adapted to be driven by the lower end 12ᵃ of the shaft 12. The rotor is mounted within a casing 40 which provides intake and discharge ports for the fluid. The discharge port $a$ passes through members 21 and 22 and communicates with a port $b$ provided by the head 7 (see Fig. 2) and thence with a vertically arranged pipe conduit $c$. Lubricating fluid, discharged by the pump, is forced upwardly through pipe line $c$ to a perforated pipe $d$ which extends horizontally beneath a cap member 7ᵈ where it is discharged over the uppermost moving parts. The lubricant then cascades downwardly over the entire transmission and finally returns to the reservoir for recirculation. Suitable passageways are provided at the various bearings to permit the lubricating fluid to reach all of the moving parts. To assist the operator, in determining whether the oiling system is properly functioning, a suitable telltale drip indicator may be provided at the front of the machine whereby he may readily note whether or not lubricating oil is being supplied to the running parts.

As shown most clearly in Figs. 3 and 4 the casing 21 of the removable and interchangeable driving units is substantially cylindrical in form and is provided with an aperture 21ᵃ adapted to receive the anti-friction bearing 17ᵇ of the shaft 17. Likewise the casing is provided with bearing apertures 21ᵇ and 21ᶜ in which the clutch actuating shaft 25ᵃ is journaled when the casing is fitted with the reversible drive elements shown in Fig. 2.

The member 22 which serves to close the lower end of the casing 21 and which also houses the lubricant pump P is provided with two concentric sleevelike portions 22ᵇ and 22ᶜ. The former which is the larger is fitted within the bore of the casing 21 and supports the anti-friction bearing 32 when the unit is equipped with the reversible drive. The portion 22ᶜ serves to house the lubricant pump (which may be removed therefrom as a unit) and also to support an anti-friction bearing 12ᵈ for the shaft 12.

From the foregoing it will be perceived that we have provided a plurality of improved unitary constructions capable of being inserted bodily in the driving transmission of a machine tool thereby to cause said transmission, to transmit either uni-directional or multi-directional rotation to a tool spindle. Furthermore, that we have provided an improved reversing unit which is exceedingly simple, compact and rigid in construction and which includes as its primary element a frame or housing which readily and selectively may be equipped either with a one-way drive mechanism or a two-way drive mechanism as may be desired.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of the United States:—

1. A reversing mechanism adapted to be applied as a unitary assembly to a shaft of a machine tool transmission combining, a casing member open at one end to receive the shaft; a pair of bevel gears journaled in coaxial alignment therein and adapted to be driven in opposite directions, each of said gears having an annular hub; anti-friction bearings between the outer periphery of each of the said hubs and said casing; a driven element adjacent the inner periphery of each of said hubs and having individual means for slidingly receiving the shaft to be driven therein; clutch means carried by each of said driven elements in a plane substantially concentric with its respective annular hub and anti-friction bearings for operatively establishing a driving relation between one of said gears and its related driven element; and a driving pinion for said gears positioned so that the resultant line of force between the teeth of the driving and driven gears passes within the pitch circle of the said anti-friction bearings and substantially in the plane of said clutch element.

2. A reversing unit combining a casing member; a pair of hubbed bevel gears journaled therein; anti-friction bearings peripherally mounting the hubs of said gears in said casing, said bearings having a pitch diameter larger than the pitch diameter of said gears; a driving pinion meshing with said gears; a driven shaft and means removably mounting said shaft in said gears; means located substantially in the plane of each of said anti-friction bearings and its associated bevel gear adapted to be selectively actuated for transmitting motion from one of said gears to said shaft; and means concentric with said shaft and between the adjacent ends of said pair of bevel gears for actuating said last mentioned means.

3. A reversing mechanism adapted to be applied as a unitary assembly to a shaft of a machine tool transmission combining a casing member for the mechanism; a pair of hubbed bevel gears journaled therein and adapted to be driven in opposite directions; a driving pinion for said gears; anti-friction bearings peripherally mounting the hubs of said gears in said casing, said bearings having a pitch diameter of such size that the resultant line of force between the teeth of the driving and driven gears passes inside thereof, each of said gears being provided with means to removably receive the shaft adapted to be driven thereby; and means located substantially in the planes of said anti-friction bearings and said bevel gears for establishing a driving relation between one of said gears and the said shaft to be driven.

4. A sleeveless reversible driving unit adapted to be inserted as a unitary assembly in a machine tool at the juncture of transverse driving and driven shaft members comprising a casing member adapted to be detachably secured to the machine frame; a pair of spaced anti-friction bearing means provided by said casing, said bearing means having their axes in coaxial alignment with the shaft to be driven; a pair of opposed bevel-gears rotatively supported in said spaced anti-friction bearings; clutch means for each of said bevel-gears including a hollow element concentrically disposed within each bevel-gear adapted to receive and operatively engage the shaft to be driven, and a clutch member coacting therewith adapted when actuated to an effective position to establish a driving connection between its associated hollow element and bevel-gear, each of said hollow elements and its associated clutch member and anti-friction bearing means being arranged to lie substantially in the same plane; said casing member being provided with an opening in a lateral wall thereof for receiving a driving shaft and bevel-gear driving pinion whereby said bevel-gears may be driven in reverse directions; and manually operable means provided by said unit and located intermediate the said opposed pair of bevel-gears for actuating one of said clutch members to an effective position selectively to effect a driving connection between its related bevel-gear and hollow element.

5. A sleeveless reversible driving unit for a machine tool comprising, a casing adapted to be inserted into the machine frame; a pair of oppositely rotating hubbed gear units peripherally journaled in said casing; means insertable through a wall of said casing for rotating said gear units in opposite directions, said gear units being provided with aligned apertures into which one end of a driven shaft is adapted to be inserted; peripherial journal bearings for rotatively supporting said gear units in said casing; and means substantially concentric with said oppositely rotating gears and said journal bearings to clutch said gears to said shaft selectively to effect a driving connection between one of said gears and said shaft.

6. A sleeveless reversing unit adapted to be inserted as a unitary assembly in a machine tool transmission comprising a substantially cylindrical casing; a pair of anti-friction bearings fitted within said casing; a pair of opposed bevel gears journaled in and rotatably supported by said bearings; clutch means located in the plane of said bearings adapted selectively to connect said gears with a shaft forming a portion of said transmission; means carried by said casing for actuating said clutches including a clutch spool coaxially aligned with said bevel gears and disposed intermediate the adjacent ends thereof, said casing being formed with a lateral aperture through which a drive shaft and a drive pinion thereon is adapted to be inserted and connected with said pair of bevel gears when said unitary assembly has been positioned in the machine tool.

7. A reversing mechanism combining a casing; a driving bevel pinion journaled therein; a pair of anti-friction bearings supported in said casing at opposite sides of said bevel pinion with their axes transverse to the axis of said driving pinion; a driven bevel gear journaled in each of said anti-friction bearings and driven in opposite directions by said driving pinion, the pitch diameter of said gears being substantially equal to the pitch diameter of said bearings; a clutch member rotatable within each of said gears, said clutch members each having a splined central bore for operative attachment to a power transmission shaft; a friction clutch ring intermediate each of said bevel gears and its clutch member, each of said friction clutch rings being approximately in the plane of the surrounding anti-friction bearing, clutch member and bevel gear; and means carried by said casing and intermediate the adjacent ends of said bevel gears for actuating said friction clutch rings selectively to effect a driving connection between said gears and said clutch members.

8. A reversing mechanism for a machine tool having a shaft adapted to be driven selectively in reverse directions comprising a pair of spaced clutch elements adapted to be secured in driving relation to said shaft; an annular clutch ring fitted in a recess provided in the periphery of each of said clutch elements, a bevel gear element concentric with each of said clutch ring and clutch elements and provided with a peripherial bearing portion; anti-friction bearings for rotatably supporting each of said bevel gears about their respective bearing portions, each of said bearings, bearing portions, clutch rings and clutch elements being concentrically arranged and lying substantially in a single plane; a transverse driving shaft; a driving gear secured thereto intermediate the adjacent ends of said aforementioned bevel gears and clutch elements and meshing with the said bevel gears; and a clutch ring actuating means intermediate the adjacent ends of said clutch elements and slidable on the said shaft to be driven for selectively actuating said clutches thereby to effect a driving of the said shaft in either direction.

LAWRENCE L. SCHAUER.
AUGUSTUS M. SOSA.